United States Patent
McCombes et al.

(10) Patent No.: US 12,500,764 B2
(45) Date of Patent: Dec. 16, 2025

(54) PAYLOAD ASSURANCE AT MULTIPLE NETWORK BOUNDARIES

(71) Applicant: The Secretary of State for Foreign, Commonwealth and Development Affairs, Cheltenham (GB)

(72) Inventors: Paul Thomas McCombes, Cheltenham (GB); John Alan Thorp, Cheltenham (GB)

(73) Assignee: The Secretary of State for Foreign, Commonwealth and Development Affairs, Cheltenham (GB)

( * ) Notice: Subject to any disclaimer, the term of this patent is extended or adjusted under 35 U.S.C. 154(b) by 146 days.

(21) Appl. No.: 18/005,554

(22) PCT Filed: Jul. 15, 2021

(86) PCT No.: PCT/GB2021/000084
§ 371 (c)(1),
(2) Date: Jan. 13, 2023

(87) PCT Pub. No.: WO2022/013517
PCT Pub. Date: Jan. 20, 2022

(65) Prior Publication Data
US 2023/0261871 A1     Aug. 17, 2023

(30) Foreign Application Priority Data

Jul. 16, 2020  (GB) ...................................... 2010968
Aug. 14, 2020  (GB) ...................................... 2012712

(51) Int. Cl.
*H04L 9/32*      (2006.01)
*H04L 9/40*      (2022.01)

(52) U.S. Cl.
CPC .......... *H04L 9/3213* (2013.01); *H04L 9/3242* (2013.01); *H04L 63/0807* (2013.01); *H04L 63/105* (2013.01); *H04L 63/107* (2013.01)

(58) Field of Classification Search
None
See application file for complete search history.

(56) References Cited

U.S. PATENT DOCUMENTS 11,509,479 B2 * 11/2022 Kunnath ............... H04L 9/3231
2005/0286540 A1  12/2005 Hurtta et al.
(Continued)

FOREIGN PATENT DOCUMENTS

EP   1249983 A2  10/2002
EP   1372315 A2  12/2003
(Continued)

OTHER PUBLICATIONS

United Kingdom Patent Application No. GB2010968.2, Search Report dated Mar. 23, 2021, 1 page.
(Continued)

*Primary Examiner* — Trang T Doan
(74) *Attorney, Agent, or Firm* — Kilpatrick Townsend & Stockton LLP

(57) ABSTRACT

A method and apparatus of payload assurance for a payload which is to be transferred across a network boundary via any of multiple predetermined boundary control devices, which may be grouped together, each having dedi¬cated perma-nent identity information. A first electronic entity provides an elec¬tronic authorisation token for defining properties of the payload, and an ephemeral ID array is determined in dependence upon the permanent identity information of each of the boundary control devices in the boundary control group and the authorisation token. An electronic release token is generated in dependence upon the ephemeral ID
(Continued)

array and the authorisation token, to be forwarded to a second electronic entity, the release token being valid for use with the boundary control devices provided in the defined boundary control group.

54 Claims, 5 Drawing Sheets

(56) References Cited

U.S. PATENT DOCUMENTS

| | | | | |
|---|---|---|---|---|
| 2012/0084838 | A1* | 4/2012 | Inforzato | H04L 63/10 726/4 |
| 2012/0317569 | A1 | 12/2012 | Payne, Jr. et al. | |
| 2018/0300471 | A1* | 10/2018 | Jain | H04L 63/105 |
| 2019/0312733 | A1* | 10/2019 | Engan | H04L 63/126 |
| 2020/0077246 | A1 | 3/2020 | Mars et al. | |
| 2020/0252799 | A1* | 8/2020 | Mercier | H04W 12/08 |
| 2021/0036890 | A1* | 2/2021 | Mishra | H04L 12/4633 |

FOREIGN PATENT DOCUMENTS

| | | | | |
|---|---|---|---|---|
| EP | 1641215 | A2 | 3/2006 | |
| ES | 2951585 | T3 * | 10/2023 | ........... G06Q 20/027 |
| JP | 2019-145050 | A | 8/2019 | |
| WO | WO-2021040784 | A1 * | 3/2021 | ........... G06Q 20/145 |

OTHER PUBLICATIONS

International Patent Application No. PCT/GB2021/000084, International Search Report and Written Opinion mailed Oct. 20, 2021, 13 pages.
Menezes et al., "Chapter 12: Key Establishment Protocols", Handbook of Applied Cryptography, 1996, pp. 489-541, CRC Press.
U.S. Appl. No. 18/005,550, Non-Final Office Action, Jun. 3, 2025, 21 pages.
Japanese Patent Application No. 2023-503185, Office Action, Apr. 24, 2025, 4 pages.
Office Action, Japanese Patent Application No. 2023-503203, Sep. 30, 2025, 26 pages.
Hogi et al., "Firewall" Internet-Related Technologies, Japan, Shokodo Co., Ltd., 1998, p. 164-185, Information Security Series, vol. 2.

* cited by examiner

| V | R | R | R | R | R | R | R |
|---|---|---|---|---|---|---|---|
| R | S | F | $T_{S1}$ | $T_{S2}$ | C | $G_{id}$ | $G_{id}$ |
| $G_{id}$ | $G_{id}$ | Null | Null | Null | Null | Null | Null |

| V | R | R | R | R | R | R | R |
|---|---|---|---|---|---|---|---|
| R | S | F | $T_{S1}$ | $T_{S2}$ | C | $G_{id}$ | $G_{id}$ |
| $G_{id}$ | $G_{id}$ | Null | Null | Null | Null | Null | Null |
| $S_{i1}$ | $S_{i1}$ | $S_{i1}$ | $S_{i1}$ | $S_{i1}$ | $S_{i1}$ | $S_{i1}$ | $S_{i1}$ |
| ... | | | | | | | |
| $S_{iN}$ | $S_{iN}$ | $S_{iN}$ | $S_{iN}$ | $S_{iN}$ | $S_{iN}$ | $S_{iN}$ | $S_{iN}$ |

$A_t$, $N_H$ values, $R_t$

Figure 3

| UUID | UUID | UUID | UUID | $T_{M1}$ | $T_{M2}$ | C | Null |
|------|------|------|------|----------|----------|---|------|
| Null | Null | Null | Null | Null | Null | Null | Null |
| Null | Null | Null | Null | Null | $S_a$ | Part | $N_H$ |

| V | R | R | R | R | R | R | R |
|---|---|---|---|---|---|---|---|
| R | S | F | $T_{S1}$ | $T_{S2}$ | C | $G_{id}$ | $G_{id}$ |
| $G_{id}$ | $G_{id}$ | Null | Null | Null | Null | Null | Null |
| UUID | UUID | UUID | UUID | $T_{M1}$ | $T_{M2}$ | C | Null |
| Null | Null | Null | Null | Null | Null | Null | Null |
| Null | Null | Null | Null | Null | $S_a$ | Part | $N_H$ |
| #(X) | #(X) | #(X) | #(X) | #(X) | #(X) | #(X) | #(X) |
| $F_{t1}$ | $F_{t1}$ | $F_{t1}$ | $F_{t1}$ | $F_{t1}$ | $F_{t1}$ | $F_{t1}$ | $F_{t1}$ |
| ... | | | | | | | |
| $F_{tN}$ | $F_{tN}$ | $F_{tN}$ | $F_{tN}$ | $F_{tN}$ | $F_{tN}$ | $F_{tN}$ | $F_{tN}$ |

PAYLOAD ASSURANCE AT MULTIPLE NETWORK BOUNDARIES

The invention is in the field of data assurance at multiple Network Boundaries or Gateways, in particular to provide assurance of the suitability and authorisation for the transfer of a payload between networks of different trust.

In a high trust network one of the most significant risks is the exfiltration of data to a low trust network causing a breach of confidentiality. The egress paths on a high trust network will be, in many cases, formed of a high assurance boundary control, such as a data diode.

Due to its status as the 'gatekeeper' for a high trust network any processes used by the boundary control must be of high assurance i.e. provides a control where there is a high certainty that the correct decision is made under all possible circumstances. The requirement for high assurance limits what is possible in the hardware boundary control. For example, highly complex data (or information) formats require complex algorithms and processes to assure them, and it is hard to achieve high assurance of the correctness of implementation of a complex algorithm. In addition, some information formats are ambiguous in specification and change over time, so keeping any algorithm both highly assured and up to date is impractical. This can even be evidenced when considering very simple control criteria relating to payload content where the criteria response is time varying, for example in the case of determining whether a specific sequence of bytes represents a valid Unicode character, the answer will vary depending on when the enquiry was made.

Public Key Infrastructure (PKI's) are typically used to facilitate secure electronic transfer of data over a network. It is used when a more rigorous authentication method is required to confirm the identities of the parties involved and to validate the data to be transferred across a network/domain boundary. However, the multiple elements needed to manage the digital certificates and public key encryption requires regular configuration and updates to maintain the desired level of system security.

In our co-pending GB application no. GB2010968.2 there is described a payload assurance system and method that uses separate electronic entities to assure the payload (using an entropy element in an authorisation token to provide an ephemeral authorisation at a network boundary device based on a permanent shared secret) and that once predetermined test criteria specified in the various tokens comprising the export header have been met at a predetermined network boundary Device, the payload is permitted to transfer across the network boundary. This application content will hereafter be referred to as Version 1.

The export headers created were only valid for a single gateway, which whilst providing security and assurance advantages, also provides a disadvantage in terms of scalability and throughput of data. Therefore, the need to achieve resilience without sacrificing security was required to enable the same payload to be sent multiple times via different gateways (and to enable capacity for dealing with the arrival of multiple identical payloads arriving at a destination).

The prior scheme also was limited in the size of payload it could accept as all manifestations of the gateway have a physical limit in size caused by the need for the entire payload to be held within in the gateway for assurance. For an effective, simple, and secure service it is desirable that consumers of any service are not constrained by such internal limitations and can send any file of any size via a service based on BCDs.

The lack of release/import metadata in the export header in the Version 1 Payload assurance scheme meant that whilst the requirement of moving payloads across a security boundary is successfully achieved, there is no indication in the header of the appropriateness of the release/import to that specific destination, nor a method of intent.

There is therefore identified a need for a scalable cross domain Payload assurance method and system which provides payload assurances relating to suitability of egress data at a cross domain boundary, and which is of an improved security, is appropriately authorised for cross domain transfer, provides ephemeral authorisation, is agile to time variations, can utilise multiple boundary control devices across a single boundary, is not constrained by the intrinsic payload size limits in the boundary control devices, and can provide centralised management control.

Accordingly, there is thus provided a method of payload assurance for a payload X which is to be transferred across a network boundary via any of multiple predetermined boundary Control devices, the method comprising:
  at a first electronic entity upon request providing:
  an electronic Authorisation token for defining properties of the payload X to be transferred;
  defining a Boundary control group located at the network Boundary comprising at least two Boundary Control Devices having dedicated permanent identity information associated with each of them;
  determining an ephemeral ID array in dependence upon the permanent identity information of each of the Boundary Control Devices in the Boundary Control group and the Authorisation token; and
  generating an electronic Release token in dependence upon the ephemeral ID array and the Authorisation token, to be forwarded to a second electronic entity, the release token being valid for use with the Boundary Control Devices provided in the defined Boundary Control Group.

The first electronic entity is the Central Release Authority (CRA) that is located in the trusted side of the network boundary. Within the CRA each permanent identity value KG is given a unique arbitrary label. A Gateway Group is an administrative collection of these labels where each Boundary Control Device (BCD) in the collection is associated with the same destination and requires the same authorisation. When the second entity (the Signer entity) requests Authorisation for a destination a single suitable Authorisation Token $A_t$ is generated. The CRA will then resolve the destination into the list of associated gateway labels, and subsequently use the Gateway labels together with the single Authorisation Token $A_t$ for a destination to perform a calculation against the $K_G$ value stored for each BCD to create a Session ID for each BCD, and finally these Session IDs are compiled into a Session ID Array. Therefore, the method may comprise generating a Session ID Array $\{S_i\}$ from Gateway Keys and Authorisation tokens $A_t$, where the Gateway keys are generated from all the gateways in the Gateway Group.

The method may further comprise generating at least one entropy element to form part of the electronic authorisation token for ensuring that multiple electronic authorisation tokens authorising the same payload properties are unique.

The Release token may be applied to one or more payload transfer authorisation requests during a period of validity of the Release token. Specific parameters may be allocated to a given signer thereby limiting what they can sign off.

The period of validity of the Release token may depend upon a predetermined time period defined in the Authorisation token by the first electronic entity. specific parameters for a given signer—limits what they can sign off.

On receipt of the Release token and upon a payload transfer request the second electronic entity may create a File token for each Boundary Control Device in the gateway group dependent upon the ephemeral array, a Local token comprising parameters defined remotely from the first entity and a hash digest of the payload X to be transferred, so as to provide an array of File tokens $\{Ft\}$. By using a hash digest, the signer can sign the file without ever having to see the complete payload, making the signing more efficient.

The hash digest may be provided by passing the payload X through a one-way function prior to the payload X being received by the second entity as a part of the payload transfer request. The hash digest in the header is accessed by the one or more boundary control devices in the Boundary Control Device Group upon receipt so as to determine the validity of the header prior to the payload X arriving at the predetermined one or more predetermined boundary control devices. This enables a more efficient criteria check at the BCD because there is no requirement to wait for the full payload.

The Local token may comprise an entropy element.

At least one of the Local token parameters are provided by a third electronic entity for validating desired payload parameters for payload transfer across the Network Boundary. The third electronic entity is an Orchestrator entity that provides validation of the payload against criteria.

A fourth electronic entity may act as a payload sender entity and the sole electronic entity in contact with the Boundary Control Devices of the Boundary Control Group and may define at least one of the Local token parameters. The fourth electronic entity may send payload X to the third electronic entity with a predetermined selection of local parameters L' for defining a portion of the local token input parameters.

A method of payload assurance for a payload X according to claim 8 or 9 wherein the third electronic entity validates the payload against predetermined rules provided upon receipt of the payload transfer request and/or the intended payload transfer destination and provides an evidence object of the validation for inclusion in the Local token, The evidence may be an array of assertions that says that a partial payload $X_1$ with digest $\#(X_1)$ can be sent. The Orchestrator sends back to the Sender a signed object (for example a JWT) that asserts the payload with the digest=$\#(X)$ and Local header L' has been approved. The Sender sends the evidence (but not the payload) to the Signer which (because it can check the signature on the JWT) can be confident that an authorised entity created the signature and be confident that the evidence is being sent by the entity whose export was approved.

The payload name will be J||n (e.g. file001) where the payload will be a fixed padded pattern for all exports.

The second entity may be configured to subsequently generate a payload Header dependent upon the Authorisation token, the Local token, the file token array and the hash digest of the payload. In the case of the export of a payload, if the second electronic entity (the signer entity) has or acquires a valid Release token and the evidence is provided by the third electronic entity (the Orchestrator entity), the Signer entity creates the Export Header for the payload and forwards it to the Sender. The Signer entity creates a Header in dependence upon the Release Token for Payloads it requires to authorise for transfer across the Network Boundary. An array of Export Headers (each with an associated Hash Table) is provided to satisfy each BCD in the Boundary Control Group.

The payload Header may be prepended to the payload X prior to the payload X being forwarded by the fourth entity to one or more Boundary Control Devices in the Boundary Control group. The fourth entity being the Sender entity and communicatively coupled to the Signer to make the payload transfer request and for the receipt of the Payload header e.g., export header. Notably the elements of the payload header may be created by the first electronic entity, the second electronic entity, the third electronic entity and the fourth electronic entity. This offers points of failure, whereby all four electronic entities are required to provide an appropriate header for the payload to be transferred.

Upon at least part of the payload having payload Header E reaching a Boundary Control Device, the Boundary Control Device may regenerate the Session ID $(S_i)_g$ using the Boundary Control devices permanent ID information and the Authorisation Token from the Header.

At the Boundary Control Device the Session ID may be used, along with parameters within the Header to calculate a file token $F_t'$. The file token generated at the Boundary Control Device is $F_t'=\#(\#(X), L, J, HMAC (K_G', A))$, all quantities are obtained from the header, apart from the value $K_G'$ which is permanent identity information of the Boundary Control Device. The Session ID is HMAC $(K_G', A)$.

The Boundary Control Device may compare the File token $F_t'$ to the File token array $\{F_t\}$ located in the Header E to determine whether the File token is identical to one of the values in the File token array $\{F_t\}$ and in the case that there is a match, may subsequently generate a first positive event outcome identifier.

The Boundary Control Device may pass the payload through a one-way function to provide $\#(X)_g$ from X and compares $\#(X)_g$ with $\#(X)$ of the Header E, and in the case that there is a match, subsequently generating a second positive event outcome identifier.

The Boundary Control Device may further compare other control criteria contained in the export or import header to ensure they are within predefined limits and in the case that it is, providing a third positive outcome identifier.

The Boundary Control device may identify a first positive outcome identifier, a second positive outcome identifier and a third positive outcome identifier and subsequently determines a positive boundary control outcome.

The Boundary Control Device transfers the payload X having Header E through the Boundary Control Device and across a network/domain boundary in the case that a positive boundary control outcome has been met.

The Boundary control device may be configured to prohibit passage of the file across the network/domain boundary and/or enable the file to be dropped in the case that a positive boundary control outcome has not been met.

The one or more Boundary Control devices of a Boundary Control Group may block invalid export headers and non-compatible payloads with valid headers in dependence upon the Authorisation token and the Ephemeral ID Array.

The payload may be split into chunks that are less than the maximum size available from the Boundary Control Devices in the Boundary Control group. Beneficially the size limit on the Boundary Control Devices in the Boundary Control Group is removed and an arbitrary payload size can be forwarded over a resilient set of Boundary Control Devices without the sender needing to know which Boundary Control Devices are available.

The method may, further comprise creating an array of Payload Headers, one for each of the payload chunks based on the Authorisation Token, File Token, Local Token and the Hash table of the Payload.

Subsequently, the method may further comprise prepending chunk's Payload Header to the corresponding chunked Payload and forwarding the resulting signed payload chunks to one or more Boundary control Device in the Boundary Control Group.

In an alternative embodiment of the invention, there is provided a payload assurance system for a payload X which is to be transferred across a network boundary via at least one predetermined boundary control device, the system comprising a first electronic entity having at least one computer processor and at least one data storage device, the at least one data storage device comprising instructions operative by the at least one computer processor to:

generate an electronic Authorisation token for defining properties of the payload X to be transferred;

define a Boundary control group located at the network Boundary comprising at least two Boundary Control Devices having dedicated permanent identity information associated with each of them;

determine an ephemeral ID array in dependence upon the permanent identity information of each of the Boundary Control Devices in the Boundary Control group and the Authorisation token; and generate an electronic Release token in dependence upon the ephemeral ID array and the Authorisation token, to be forwarded to a second electronic entity in the system, the release token being valid for use with the Boundary Control Devices provided in the defined Boundary Control Group.

The first electronic entity is the Central Release Authority (CRA) located on the trusted side of the network boundary, and each permanent identity information value $K_G$ of a Boundary Control Device (BCD) is given a unique arbitrary label. A Boundary Control Group is an administrative collection of these labels where each BCD in the collection is associated with the same destination and requires the same authorisation. When the second entity (a Signer entity) requests Authorisation for transferring a payload to a destination a single suitable Authorisation Token $A_t$ is generated. The CRA may then resolve the destination into the list of associated Boundary Control Device labels, and subsequently use the Boundary Control Device labels together with the single $A_t$ for a destination to perform a calculation against the $K_G$ value stored for each BCD to create a Session ID for each BCD, and finally these Session IDs are compiled into a Session ID Array.

The electronic authorisation token may further comprise at least one entropy element for ensuring that multiple electronic authorisation tokens authorising the same payload properties are unique.

The multiple separate and distinct electronic entities, comprising of at least one Authoriser entity, at least one Sender entity, at least one Signer entity, and at least one Payload validation entity i.e. the Orchestrator. The Signer, Sender and Orchestrator roles need not be separated out, but may instead be combined into various consolidated roles. For example, is possible to collapse/combine i. the sender and orchestrator roles, ii. The sender and signer roles, and iii. all three.

The system may further comprise the Signer entity being configured to sign any number of payloads using the Release token during a period of validity of the Release token.

On receipt of the Release token and upon receipt of a payload export request the Signer entity may be configured to calculate a file token for each Boundary Control Device in the gateway group dependent upon the ephemeral array, a Local token and the hash digest of the payload to be transferred, so as to provide an array of file tokens $\{F_t\}$. Use of #X enables the signer to sign off the payload transfer without actually having to receive the payload and as such there is no checking of the payload by the signer.

The hash digest may be provided by passing the payload through a one-way function prior to forwarding the payload X to the Signer entity. For the avoidance of doubt the use of the hash digest in the header enables the Boundary Control Device to determine the validity of the header prior to the payload X arriving at the predetermined one or more predetermined Boundary Control Devices.

The Local token defines parameters associated with the payload, the payload transfer destination and/or as defined by the Sender entity. Beneficially the Local token is devoid of information re: number of gateways, parts, actual size or classification. The system is therefore configured to undertake checks on the Authorisation token content as well as alternative release criteria provided by the e.g., Local Token.

The local token may further comprise an entropy element.

The Local token parameters may be provided by the payload validation entity and/or the Sender Entity.

The payload validation entity is configured to validate the payload against predetermined rules of the requester and/or the payload destination and is configured to provide an evidence object of the validation for inclusion in the Local token.

The evidence object may be an array of assertions that says that a partial payload $X_n$ with digest $\#(X_n)$ can be sent. The Orchestrator sends back to the Sender a signed object (for example a JWT) that asserts the payload with the digest=$\#(X)$ and Local header L' has been approved. The Sender sends the evidence (but not the payload) to the Signer when making the file transfer request. The Signer entity can then be confident that an authorised entity created the signature and that the evidence is being sent by the entity whose export was approved.

The Signer entity is configured to subsequently generate a payload Header dependent upon the Authorisation token, the Local token, the File token array and the hash digest of the payload.

The Signer creates a Header in dependence upon the Release Token for Payloads it requires to authorise for transfer across the Network Boundary. In reality it produces an array of Export or import Headers (each with an associated Hash Table). The headers are then forwarded to the Sender entity or other entity that made the payload transfer request.

The header may then be prepended to the payload prior to being forwarded to one or more BCDs of the in the gateway group.

The payload may be split into chunks that are less than the maximum size available from the Boundary Control Devices in the Gateway group.

Therefore, the size limit on the Boundary Control Device is removed and an arbitrary file can be forwarded over a resilient set of gateways without the sender needing to know which gateways are available.

The system may further comprise the Signer entity being configured to create an array of Payload Headers, one for each of the payload chunks based on the Authorisation Token, File Token, Local Token and the Hash table of the Payload.

The system may further comprise prepending chunk's Payload Header to the corresponding chunked Payload and forwarding the resulting signed payload chunks to one or more Boundary control Device in the Boundary Control Group.

On receipt of the payload at a Boundary Control Device, the Boundary control device may be configured to regenerate the gateway session ID $(S_t)_g$ using the Boundary Control devices permanent ID information and the Authorisation Token from the Header.

At the Boundary Control Device, the Session ID may be used, along with parameters within the Header to calculate a file token $F_t'$.

The File token created at the Boundary Control Device is: $F_t'=\#(\#(X), L, J, HMAC (K_G', A_t))$ with values taken from the header, with the expectation of $K_G'$ which is obtained from the Boundary Control device. The Session ID is HMAC $(K_G', A_t)$.

The Boundary Control Device may comprise a comparator that may compare the File token $(F_t)_g$ to the File token array located in the Header E to determine whether the File token is identical to one of the values in the File token array $\{F_t\}$ and in the case that there is a match the comparator is configured to generate a first positive event outcome identifier.

The Boundary Control Device may be configured to pass the payload through a one way function to provide $\#(X)_g$ from X, and the comparator subsequently compares $\#(X)_g$ with $\#(X)$ of the Header, and in the case that there is a match the comparator is configured to generate a second positive event outcome identifier.

The Boundary Control Device may further compare other control criteria contained in the export or import header to ensure they are within predefined limits and in the case that it is, the comparator configured to provide a third positive outcome identifier.

The Boundary Control device may be configured to identify a first positive outcome identifier, a second positive outcome identifier and/or a third positive outcome identifier and subsequently determining a positive boundary control outcome in dependence upon the first positive outcome identifier, the second positive outcome identifier and the third positive outcome identifier.

The Boundary Control Device may be configured to transfer the payload X through the Boundary Control Device and across a network/domain boundary in the case that a positive boundary control outcome has been met.

The Boundary control device may be configured to prohibit passage of the file across the network/domain boundary and/or enable the payload to be dropped in the case that a positive boundary control outcome has not been met.

The at least one Sender entity may be the sole electronic entity in communication with the at least one Boundary Control Device.

The system may comprise a random number generator or pseudo random number generator for providing the entropy element of the electronic Authorisation token and/or the Local token.

There may alternatively be provided an export control system comprising the payload assurance system as herebefore described.

In an alternative embodiment of the invention, there may be provided a computational device comprising the payload assurance system for assuring a payload for transfer from a lesser trusted network to a trusted network (or vice versa) as hereinbefore described.

In a yet alternative embodiment of the invention there is provided a network comprising a payload assurance system for assuring a payload for transfer from a lesser trusted network to a trusted network (or vice versa) as hereinbefore described.

In all instances the Boundary Control Device may be a Gateway device and the two terms may be used interchangeably.

Once the authorised payload properties are specified through issuance of the Authorisation Token there is no option to change the authorised payload properties. This means that the boundary control device is not required to have any knowledge of the details of the validation scheme, but rather the interrelationship between entities in the scheme e.g. the gateway only considers checkable assertions between the headers, intrinsic properties of the payload (e.g. size, compliance with boundary control device known file types), environmental factors (e.g. time limits). Or in other words, the BCD does not have any prior knowledge of the specific values of the authorised payload properties for a given payload, but it can determine the permitted properties for the payload from the export header.

This allows for the use of sealed for life gateways to make release decisions autonomously. Autonomous in this instance means decisions are made without reference to other electronic entities. This maintains isolation (or separation) of the determination of authorisation parameters (at the CRA) and verification decision that a payload complies with the parameters at the gateway and prevents the need for requesting the authentication decision from an alternative electronic entity, improving the security at the gateway by eliminating the ability for this decision information to be compromised by a third party. The boundary device can therefore comprise the simplest possible device that never requires replacement or updates and which never changes. However, the method of generating the Export Header assures that the determined authorisation parameters cannot be altered by any intermediate system between the CRA and the BCD.

Only authorised payloads/exports may be allowed to be transferred across the domain boundary. A good export scheme usually considers: control of content, time limited authorisation, and ultimately stops the passage of unauthorised formats. Beneficially, the system may be configured to control the authorisations with an electronic token.

Computational devices may comprise a desktop or laptop computer, tablet, personal digital assistant (PDA), mobile phone, smart watch, hard disc, solid state disc or drive, memory, or other smart or mobile device capable of storing and/or displaying data or otherwise acting as a data device, or a display device comprising a monitor, projector, screen or the like, capable of storing and/or displaying data or otherwise acting as a data device are also disclosed, which may individually and/or collectively comprise a device as outlined above for the user's convenience.

"Export Payload" is formed of a header and a payload. But it must be noted that the payload assurance system and method can be used on Packets of data that also include a packet header and packet data where a new packet would be created with an Export Header and the original Packet contents, and also for streaming data where the export header is prepended before the streaming data. This packing of the original payload in the new packet is a tactic that is commonly used in tunnelling protocols and would be known to the person skilled in the art.

Whilst the invention has been hereinbefore described it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which: —

FIG. 2 shows an Authorisation token format in accordance with the invention;

FIG. 3 shows a Release Token format in accordance with the invention;

FIG. 4 shows a Local Token format in accordance with the invention;

FIG. 5 shows a Payload release Header format in accordance with the invention;

Figure 6:
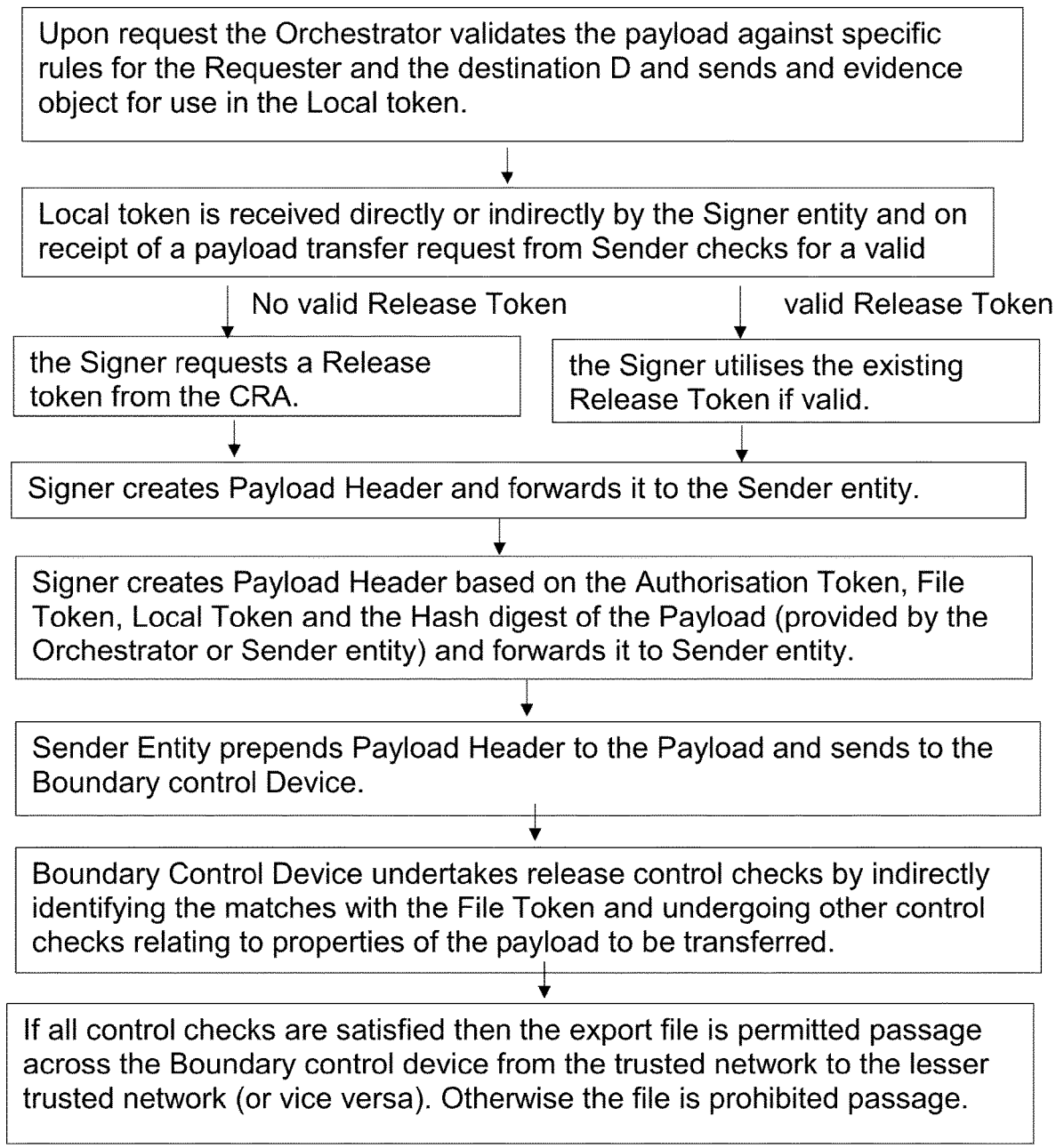
Figure 7:
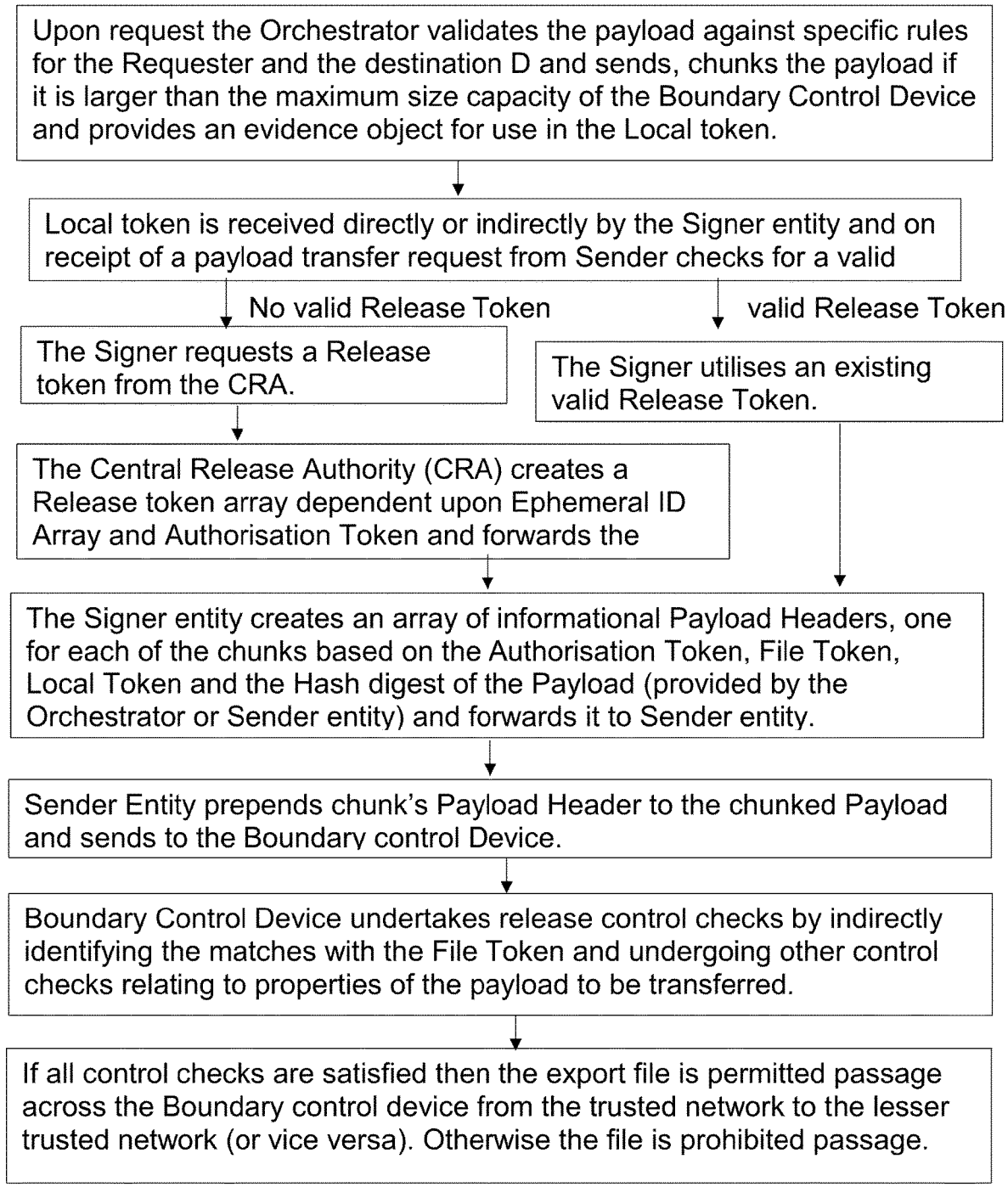

FIG. 6 flow diagram of the method of payload assurance at the network boundary in accordance with a first aspect of the invention; and FIG. 7 flow diagram of the method of payload assurance at the network boundary in accordance with a second aspect of the invention where the payload is chunked.

In the Figures like elements are denoted by like reference numerals. The skilled reader will appreciate how complex the implementation of the method is, and thus the number of the optional features present, will be driven by the user requirements.

Figure 1:
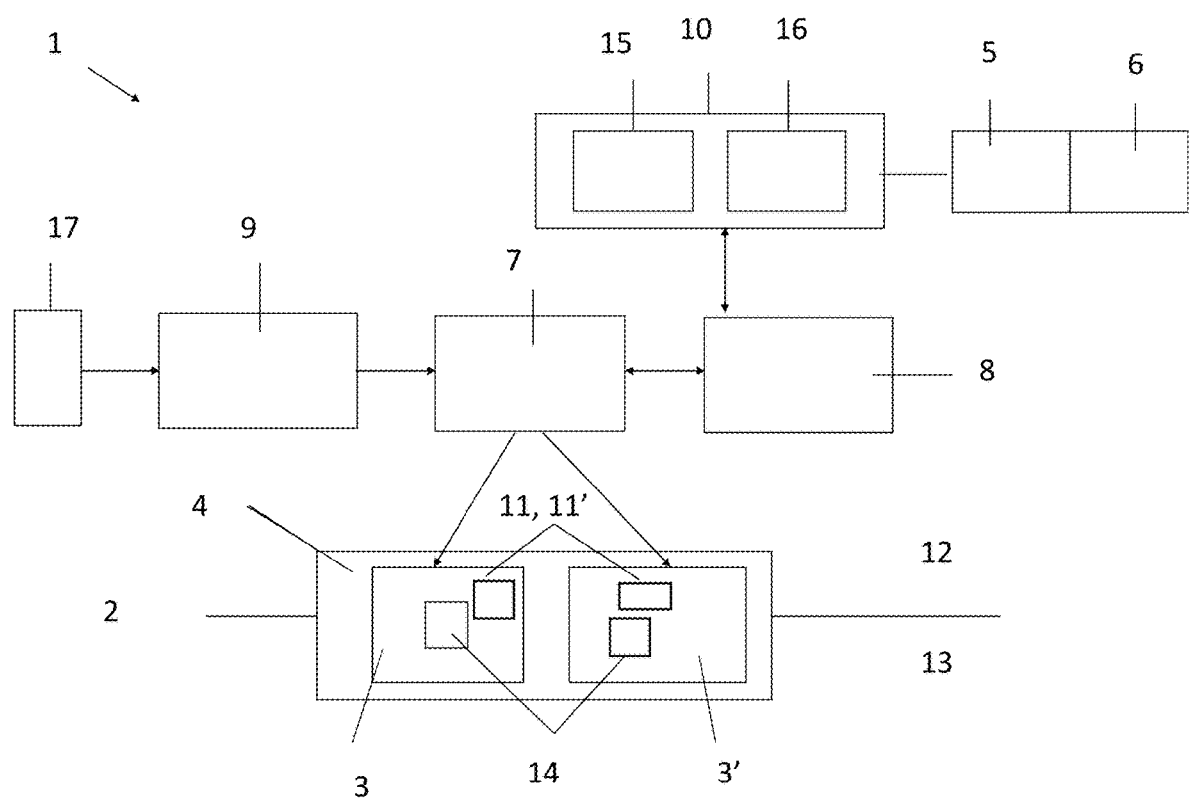
FIG. 1 is a schematic of the system for payload assurance at a network domain boundary in accordance with a first aspect of the invention.

Referring to FIG. 1, there is provided a Payload authorisation control system 1 having payload X with Header E which is to be transferred across a network boundary 2 via a Boundary Control Device 3 (e.g. a Network Gateway formed of hardware) being one device in a Boundary Control Group 4, the system 1 comprising a computer processor 5 and a data storage device 6. For the payload assurance scheme to operate there are several roles or electronic entities that must undertake specially allocated functions. FIG. 1 shows that there are five electronic entities in this system. These electronic entities comprise the following:

The Sender 7: this entity is in electronic communication with the Boundary Control Devices 3, the Signer 8 and the Orchestrator 9. The Sender entity 7 sends the payload based on provision of a positive assurance outcome from the Orchestrator 9 followed by a positive outcome from the Signer 8.

The Central Release Authority 10 (CRA): This entity manages access to Export Gateway Permanent Identity Blocks and the mapping of Boundary Control Devices to Destinations. It is also responsible for creation of the Authorisation token of FIG. 2 on enquiry from the Signer 8. This entity is in electronic communication with the Signer 8 only.

The Signer 8 requests authorisation appropriate to its role that allows it to create export or import headers for a given approved payload. The Signer 8 requests the authorisation token from the CRA 10 and approval of the request for the payload to export/import based on evidence from the Orchestrator 9. In all instances signing the payload refers to creating the Header for use with the payload to be transferred across a Boundary Control Device 3, 3'.

The Orchestrator 9 assesses the payload against Enterprise release criteria (for the avoidance of doubt this differs to the BCD release criteria) and if satisfactory then the Orchestrator 9 will provide evidence that a payload is approved for export, and provides additional information needed for the Signer 8 entity to create the Export/Import Header. Evidence will generally be an information structure (such as JSON or XML) although the exact format is immaterial to the operation of the scheme. Evidence may by digitally signed (using conventional means) to provide integrity protection. The evidence may be passed directly or indirectly to the Signer 9.

The Boundary Control Devices 3, 3' (BCD) e.g. the export gateway, possesses a unique Identity Block 11, 11'. The BCD 3, 3' is configured to block any payload that has an invalid export header and will block any payload that is not compatible with the export header, even when the export payload is valid.

Gateway/Boundary Control Group 4—a set of one or more Boundary Control Devices 3, 3' allowing exports to the same destination with the same authorisations intended to be treated as a single composite entity in the scheme.

A standard network load balancer (not shown) will act to direct signed payloads from the Sender 7 to one or more of the BCDs 3, 3' based on a standard operator-selected load balancing algorithm.

In a first embodiment of the invention, the Authorisation Control and Assurance System (hereafter referred to as the Assurance System) is configured to provide an authorised payload export across single or multiple BCD's 3, 3'. The Authorisation System (which includes checks to be undertaken at the BCD itself) allows some intrinsic properties of the payload (e.g. payload type) to be controlled, asserted properties (e.g. classification) to be compared, administrative features to be added, as well as enabling the lifetime for the authorisation to be managed via an electronic token. The scheme creates and uses payload specific headers comprising four independent sub-tokens prepended to a specific payload. Only if the information in the header is assured as valid will the payload successfully obtain passage through the BCD 3, 3' as requested by the Sender entity 7.

The Header and its component parts have two manifestations—an information representation (such as may be contained in a human readable JSON or XML file) and a binary representation which is a byte-level representation of how they are encoded in the Header for use in the functions underpinning the scheme. For simplicity both representations will be denoted by "token" (e.g. "authorisation token") and the form of the token (information or binary) will be made explicit when significant. The Header may be an export header or an import header in dependence upon the intended direction of transfer across the BCD 3, 3'.

The data storage device comprises instructions operative by the processor to provide an Authorisation Token $A_t$ which will be described in more detail. This provides means of signing by an Authorised entity that can be consistently applied to various payload transfer authorisation requests.

The Boundary Control Device 3, 3' is a Network Gateway located at a network domain boundary 2 i.e. located at a position enabling passage between a first network 12 and a second network 13 (or vice versa depending on whether export or import of the payload is required). For exports, the side of the network in which the CRA resides is the trusted network 12, whereas the other network is the lesser trusted network 13.

As an example, requests for exporting a payload in this embodiment are made to the Orchestrator 9 by a suitably authorised party. As well as accepting such requests the Orchestrator 9 can use external or local services to determine the suitability of the payload for the requested export. These checks will be akin to standard controls used by an enterprise such as data loss prevention (DLP), malware scanning, removal of hidden metadata and others obvious to those skilled in the art. The Orchestrator 9 orchestrates these services to obtain a status that either approves or denies export at the Orchestrator 9.

When an export is approved then the Orchestrator 9 must assemble the evidence, which is the set of information pertaining to the export that allows the Signer to create an array of File Tokens and consequently the Export Header for the Payload X.

This use of the Signer 8, Sender 7, and Orchestrator 9 in this embodiment to each create parts of the Payload Header e.g. export Header assures that defects or compromises in relation to one of the entities does not permit misuse or unexpected use of the system.

Whilst the Signer entity 8 is configured to create the Payload Header by combining various tokens (to be described in more detail later) into a binary Export Header it is the Sender entity 7 that i. prepends the Export Header to the relevant payload, and ii. sends the signed payload to the Boundary Control Devices 3, 3'.

The CRA 10 acts as an authorising entity whereby it provides a Release Token $R_t$ which is a unique token generated upon the Signer entity enquiry. The CRA 10 stores the Boundary Control Device Permanent Identifier and is responsible for generating a Session ID Array $\{S_i\}$ from Gateway Keys and Authorisation tokens $A_t$, where the Gateway keys are generated from all the gateways in the Boundary Control Group 4. The Session ID Array contains moderately sensitive, ephemeral values (or ephemeral identities) which expire regularly so pose no long-term risk. The Authorisation Token $A_t$ and the Session ID Array $\{S_i\}$ are forwarded as a pair as a response to the Signer entity 8 enquiry. This pair defines the Release Token as shown in FIG. 3.

The Signer entity 8 requests a Release Token from the CRA 10 and creates a Header in dependence upon the Release Token for Payloads it requires to authorise for transfer across the Network Boundary 2.

The Authorisation Token created by the CRA 10 is an electronic token formed at least of a first part relating to authorised properties of the payload and a second part for providing entropy (or randomness) to the token, therefore $A_t$=<entropy element> and <centrally specified parameter values>. The Authorisation token contains details about what the CRA 10 authorises to be passed over one or more BCDs 3, 3' and also information about the Authorisation token itself, including its validity period. The entropy part is provided to ensure that multiple Authorisation Tokens authorising the same payload properties are each unique. This enables for the specification of properties and associated authorisations to be centrally controlled (e.g. on the trusted network side) and ensures that each authorisation request and associated response is distinguishable and as such auditable. In this embodiment the payload is an export payload to be transferred between a trusted network 12 and a lesser trusted network 13 across any one or more Boundary control devices 3, 3' in a predetermined Boundary Control Group 4.

This Permanent Identity Information e.g. Identity block or other Key type associated with the Boundary Control Device 3, 3' is highly sensitive information and must be stored very securely. The Permanent Identity information will hereafter be referred to as the Permanent ID of the predetermined Boundary Control Device 3 and denoted $K_G$.

The Permanent ID $K_G$ related to the Boundary Control Devices 3, 3' in the system must be known at the CRA 10.

The Boundary Control Device 3, 3' can i. have a $K_G$ created at manufacture that is presented securely to the CRA 10, ii. have a $K_G$ created by the CRA 10 loaded onto it, or iii. have a $K_G$ created by an independent source loaded onto it and this same $K_G$ loaded onto the CRA 10.

Within the CRA 10 each $K_G$ value is given a unique arbitrary label. A Boundary Control Group 4 is an administrative collection of these labels where each BCD 3, 3' in the collection is associated with the same destination and requires the same authorisation. When the Signer entity 8 requests Authorisation for a destination a single suitable Authorisation Token $A_t$ is generated. The CRA 10 will then resolve the destination into the list of associated gateway labels, and subsequently use the gateway labels together with the single $A_t$ for a destination to perform a calculation against the $K_G$ value stored for each BCD 3, 3' to create a Session ID for each BCD 3, 3', and finally these Session IDs are compiled into a Session ID Array.

The Authorisation token, can be mapped to a set of numerical values and used in the one-way functions described below. Provided all parts of the Assurance system use the same mapping, the specifics of the mapping are not significant. The Authorisation token is a component of the Export Header to be provided to the Signer entity 8. For the avoidance of doubt, the Authorisation Token contains the Central Authorisation Controls which are assertions of what is permitted to be exported across the Boundary Control Device 3, 3' for example, the Authorisation Header comprises:

Version—(i.e. version 2);
Entropy (to assure uniqueness of each Authorisation Header);
Size—the maximum size (in bytes) of the payload (zero meaning no limit);
File Type—BMP, or other defined suitable file types as required e.g. csv, or type of packet;
Time—provision of 'not valid before' or 'not valid after' so as to control the lifetime of the token;
Payload assertions (to be described below); and
Destination identifier (to be described below).

The system is configured to undertake checks on alternative release criteria, as well as undertaking checks on the CRA specified criteria. The alternative release checks are provided for in a Local header.

In contrast to Version 1, the Local header is not exclusively created by the Sender entity 7, instead the number of hashes in the hash table, the part number, and the actual size of the Payload is set by the Orchestrator 9—all other fields are set by the Sender 7. This provides a level of validation by the Orchestrator 9. The part number can be used in conjunction with the UUID to uniquely identify the BCDs.

The Local Header (or Local Token) as shown in FIG. 4, comprises

Export UUID—Generated by the Orchestrator entity 9, this uniquely identifies each individual export. It should be generated randomly as a type 4 UUID and also replaces the nonce of version one.
Time limits—Generated by the Sender 7, of which it is authorised to export the file (which may be shorter that then period of validity of the Authorisation Token.
Payload Assertions—described below.
Actual Size—Generated by the Orchestrator 9 this is the actual size of the export payload (excluding header) in bytes.
Part number—generated by the Orchestrator 9 and is usually 0 (zero) unless the payload is chunked.

Number of File tokens (or hashes)—generated by the signer 8 and is the number of File Tokens for the payload provided by the Signer 8 i.e. number of export hashes in the hash table.

Firstly, considering Payload assertions, to enable document classification authorisation the classifications are transformed into a numerical representation to enable the Boundary Control Device 3, 3' to check it. Several schemes are available to the user and no such scheme has an indefinite lifetime.

One such scheme creates a new Authorisation Token parameter called "Classification" which can be used to describe the maximum classification of document that is allowed to egress the Boundary Control Device. A typical scheme would be the classifications (OFFICIAL, CONFIDENTIAL, SECRET, TOP SECRET). Similarly, for the Local Token this also has a defined parameter called Classification with the same permitted values which is the value of the Classification that is asserted by the Sender 7.

These permitted values are then mapped into numerical values for each header. One such scheme would be
OFFICIAL—100
CONFIDENTIAL—200
SECRET—300
TOP SECRET-400

To implement this the Boundary Control Devices 3, 3' would have to be instructed to compare the pair of encoded values in the Export Header against a specific logical operation. In this case $A_t$: Classification>=Lt: Classification.

Other characteristics features of protective marking schemes can be similarly handled within the Boundary Control Device using different logical operators to compare the mapped values in the various Tokens that make up the Export Header.

The Destination Identifier allows a routing and an audit system to be directly determined from an export header, the intended Gateway Group 4 and therefore a destination.

The Release Token $R_t$, which includes the Authorisation Token and the Session ID Array, is created by the CRA 10 and given to the Signer entity 8 and is used in the generation of every payload header until its validity period expires or it is replaced by an updated Release Token upon a subsequent request from the Signer 8 to the CRA 10. It is only the entropy element that ensures a unique response to each Authorisation Token request.

The Release Token $R_t$ authorises the Sender 7 to send payloads. It is not a payload specific authorisation and any number of payloads can be signed using the Release Token $R_t$ during its period of validity.

The CRA 10 creates the Authorisation Response, by firstly providing an intermediate value in the form of a Session ID, which is obtained by combining the Authorisation Token and the selected Gateway Permanent ID $K_G$ using a one-way mathematical function i.e.

$$S_i = f(K_G, A_t), \text{ where}$$

$S_i$ is the session ID for a specific Boundary Control device;
$K_G$ is the Permanent ID for the specific gateway; and
$A_t$ is the authorisation token (in byte format).

This process is repeated in this embodiment for each gateway 3, 3' in the Gateway Group 4 to provide the array $\{S_i\}$.

In this embodiment to allow use of standard functions in standard HSM appliances the one-way mathematical function is calculated using HMAC providing a session ID for a given gateway 3, 3' of:

$$S_i = HMAC(K_G, A_t), \text{ where}$$

$S_i$ is the session ID for a specific Boundary Control device;
$K_G$ is the Permanent ID for the specific gateway; and
$A_t$ is the authorisation token (in byte format).

The $S_i$ creation process is repeated for each gateway 3, 3' in the Gateway Group 4 to provide the array $\{S_i\}$. The associated secret key used in the HMAC function is formed of the Permanent ID of that Boundary Control Device 3, 3'. For the avoidance of doubt, each Session ID and therefore the Session ID Array is created in the CRA 10 and the one-way mathematical function f is compatible with the predetermined Boundary Control Devices selected for the payload transfer.

At no stage in this embodiment does the Signer access $K_G$. Instead, the step of generating $S_i$ effectively creates an array of ephemeral identities which are derived from the shared Permanent ID $K_G$ and which is used by the Signer Entity 8 when forwarding the file for transfer across the network boundary 2, thereby alleviating the need to send the Permanent ID value. The Permanent ID remains an unknown value to the Signer 8 and Sender 7 entities. In fact, apart from the BCD 3, 3', the CRA 10 is the only other entity that can access $K_G$.

Upon a valid request from the Signer entity 8 to use export gateway G 3, 3' the CRA 10 will calculate the HMAC and return the Release Token $RT = (A_t, \{S_i\})$ to the Signer Entity. The HMAC calculations used to create $\{S_i\}$ will be recreated at the gateway 3, 3' to assure that the associated $A_t$ must be genuine as shall be discussed later.

When in possession of $R_t$, the Signer entity 8 generates a File Token as follows: $F_t = g(\#(X), L_t, S_i)$, wherein $\#(X)$ is the hash digest of the payload X. As an alternative the payload X could be used instead of $\#(X)$.

The Authorisation Token $A_t$ does not need to be directly used in the generation of $F_t$—here it is indirectly used as it is a component of the calculation of $S_i$.

The function g is compatible with the predetermined Boundary Control Devices 3, 3', but the function g need not be the same function type as the before mentioned f. In this example, the g is a hash function such that $$F_t = \#(\#(X), L_t, S_i).$$

Other parameters such as payload name can be added to the hash calculation provided the Boundary Control Device 3, 3' also has access to these parameters if the parameters are required to be used in an authorisation decision by the Boundary Control Device.

For example, to create the File Token array $\{F_t\}$ for a payload of name J then the Signer entity, upon being requested to sign payload X with hash $\#(X)$, will calculate for each gateway 3, 3' in the Gateway Group 4:

$$F_t = \#(\#(X), L_t, J, S_i)$$

where
X is the byte steam of the payload;
$S_i$ is the session ID (in byte format) of each gateway in turn;
$L_t$ is the local token;
J is the payload name; and
\# denotes a suitable hash function also available to the boundary control device,
J+ is the file name and is used as a parameter in applications to assure that the file name remains unchanged through the export control process. For ease of use with the calculations which form part of the export process, the file name may be extended to a fixed predetermined size limit using a standard padding character, and the padded filename is denoted as J.

For the avoidance of doubt, the hash function providing a digest of X, and the hash function providing $F_t$ may be different.

Apart from the BCD 3, 3' only the CRA 10 knows $K_G$, and therefore only it can generate the Session ID Array $\{S_i\}$. Only Authorised Signers 8 know $\{S_i\}$ and only they can generate $\{F_t\}$ that is acceptable to all BCD's 3, 3' that were in a given Gateway Group 4 when $\{S_i\}$ was created, e.g. a group of export gateways. This provides the ability to add or remove BCDs to the Gateway Group 4 after an array has been created, whilst ensuring the file assurance scheme will still operate for the original BCDs. However, note there will be no ability to use the subsequently added BCD due to incompatibility with the earlier generated $\{S_i\}$.

The Export Header is created at the Signer and is structured as:
  Authorisation Header
  Local Header
  Payload Hash
  File Token Array Therefore, rather than use of the File Token $F_t$ there is instead provided an array containing multiple File Tokens $\{F_t\}$.

The way of calculating $F_t$ is very efficient so there is very low overhead for creating File Tokens $\{F_t\}$ to cover each additional gateway 3, 3'.

There is no specific upper limit on the number of File Tokens in the Export Header as this will be implementation dependent and the choice will depend on the maximum payload size (including header). By the use of the ephemeral identities $\{S_i\}$ then there is no additional demand placed on the HSM per payload, and the number of File Tokens in the export header need not be constrained by limitations of HSM implementations.

A value in the File Token table is $F_t=\#(\#(X), L, J, S_i)$, where a separate $S_i$ is used for every potential gateway that may be used to reach the destination.

The Payload Hash #(X) is created by the Orchestrator 9 and is provided to the Signer entity 8 as part of the Orchestrator Evidence.

For the avoidance of doubt and as shown in FIG. 5, the Export Header informational format as created by the Signer Entity 8 is $$E=(A_t\|L_t\|\#(X)\|\{F_t\}).$$

Where each of the components within the Export header is the information format of that Token or Array, or the Hash Digest. The informational formatted Header is then forwarded to the Sender entity 7 where it is converted to binary format and prepends the binary Header to the Payload giving the new signed payload as $P=E\|X$.

The signed payload is then forwarded to the Boundary Control Devices 3, 3' of the system.

At the Boundary Control Device 3, 3', comparisons are made between the payload properties and the pre-set Boundary Control Device parameter criteria. Additionally, compliance checks are made against the payload properties CRA 10 prescribed parameter criteria which form part of $A_t$.

The Boundary Control Device holds its key and is configured to check the signed payload by checking that it was directed as intended and to check that the payload is compatible with the Local token and the Authorisation token. To ensure that the CRA prescribed parameters are indeed authorised parameters they are only accessible when the Boundary Control Device has undertaken a variety of authorisation criteria checks.

The calculations in the gateway are:
  Generate $S_i'$=HMAC $(K_G', A_t)$ from the internal $K_G'$
  Generate $F_t'=\#(\#(X)_h, L_t, J, S_i')$ from the headers and $S_i'$ above
  Check that $F_t'$=exactly one of $\{F_t\}$ from the header
  Calculate $\#(X)_g$ from X and check $\#(X)_g=\#(X)_h$
  Perform comparison checks against the payload and the $A_t$ and $L_t$ headers (where $L_t$ is provided) as described in our co-pending XXX.

Ultimately the most important criteria to be achieved being provided by regenerating the Session ID (or ephemeral identity) $S_i$ at the Boundary Control Device by using the value of $A_t$ received from the Sender Entity (i.e. Header 1) and the Boundary Control Device 3, 3' local Permanent Identity Information ID (which as mentioned previously is configured to be identical to that used by the CRA).

Provided the regenerated gateway Session ID $S_i'$ can be used with parameters within the Export Header to generate a gateway File Token $F_t'$ that is identical to one of the file tokens in the File Token array $\{F_t\}$, then the header parameters are determined to be validly authorised and payload compliance checks are made at the Boundary Control Device 3, 3'.

The Boundary Control Device has a comparator configured to undertake a simple comparison test of the payload content against both the CRA specified parameter criteria, the Local criteria of the Local token and internal criteria specified at the Boundary Control Device (which are pre-configured factory settings).

Importantly, the CRA 10 provides the 'critical' payload criteria and these conditions must be met in order to validly authorise the payload to be transferred across the network domain boundary.

It is only once all of these tests are undertaken that the comparator 10 is able to determine a payload delivery outcome to be applied. For example, the payload is released by the Boundary Control Devices 10 i.e. transferred from the trusted network 12 to the lesser trusted network 13 across a network boundary 2 if all of the test criteria have been met. If any of the test criteria flag a failure, then the payload X will not be permitted to pass through the Boundary Control Device 3, 3' between the trusted network 12 and the lesser trusted network 13. Therefore, there is no transfer of the payload X across a network domain boundary in this instance.

In the case that the Release Token $R_t$ provided at the Boundary Control Device is not identical to that produced by the Sender entity 6, there is no permission for the Boundary Control Device to access the specified parameters and there is no authorisation obtained for transfer of the Payload X between the trusted network and lesser trusted network via the Boundary Control Device 3, 3'.

This conditional criteria check effectively enables the intrinsic properties as specified by the CRA 10 to be autonomously assured by the Boundary Control Device.

In this embodiment, it is reiterated that the Sender Entity 7 and/or the Orchestrator inserts additional local payload property criteria which may be the same type (e.g. a time constraint) or a different type to those specified by the CRA via the Local Token. This allows for the Sender Entity to place additional constraints on the payload release decision which occurs at the Boundary Control Device.

A File Token array $\{F_t\}$ therefore becomes $\{\#(X, L_t, S_i)\}$, with an entry for each $S_i$ in the Session ID array. The Export Header is then provided by ($A_t$, $L_t$, #(X), {$F_{t_n}$}). Once again, the Export Header gets prepended to the payload X before being forwarded from the Sender Entity 7 to the Boundary Control Device. Therefore, an Export header is created for use with the payload X to be exported, wherein, at least part of the Export Header comprises the File Tokens $F_t$ created for each BCD 3, 3' or the Boundary Control Group 4. This enables a simple comparison test of the Export Header against both the file, environment information (e.g. time) and internal information of the gateway (which are pre-configured factory settings or the identity of the gateway). For the avoidance of doubt, it is only once all of these tests are undertaken that the comparator 14 is able to determine a file delivery outcome to be applied. For example, the file is released by the Boundary Control Device 3 i.e. transferred from the trusted network to the lesser trusted network across a network boundary if all of the test criteria have been met. If any of the test criteria flag a failure, then the payload X will not be permitted to pass through the gateway between the trusted network and the lesser trusted network. Therefore, there is no transfer of the payload and its payload across a network domain boundary in this instance.

This embodiment effectively enables intrinsic properties to be autonomously assured by the Boundary Control Device and the same autonomous assurance can also be applied to the Local Token $L_t$ properties.

The assurance of the authorisation parameters may be further strengthened by providing the Authorising Token $A_t$ and Local Token $L_t$ as a series of paired constraints and assertions (respectively) that are compared against each other using the comparator function located at the Boundary Control Device 3, 3'.

Specifically, the Boundary Control Device comparator 14 undertakes a comparison of respective values between the Local Token $L_t$ which specifies local criteria and the Authorising Token $A_t$ which is the Central Service authorised parameters.

It is reiterated that importantly the CRA 7 has knowledge of the unique Permanent ID associated with a pre-determined gateway that is to export the payload X and that the Signer Entity 8 has an ephemeral ID and does not know the Permanent ID of the Boundary Control Device 3, 3'. The Permanent ID is effectively a secret key value that is dependent upon the identity of a given gateway 3, 3'.

The Boundary Control Device 3, 3' is configured to check that payload sent to it has been authorised ultimately by the CRA 10. In the case that the payload is authorised and compatible with predetermined criteria (stored within a payload header prepended to the payload desired to be released) the payload is transmitted. If the check determines that the payload is not authorised or not compatible with the export header, the Boundary Control Device drops the file.

A random number generator 15 is used by the CRA to provide the entropy element of the Authorisation Token $A_t$. The permanent ID information is stored in a secured storage area 16 in the CRA. Alternatively, a pseudo random number generator may be used. Similarly, a Random number generator (not shown) is used by the orchestrator when generating its elements of the Local Token. Alternatively, a pseudo random number generator may be used.

In use, there is provided a method of assuring a payload for transfer across a network boundary 2 via a Boundary Control Device 3, 3' using the here-before described system. For the avoidance of doubt, only if a File Token $F_t$ is valid and all the tests passed then is the payload released.

Placing #(X) in the header allows the calculation of $F_t$', and therefore the validity of the header before all the payload arrives. The $S_{actual}$ parameter in $L_t$ stops a longer or shorter X being used. Ultimately this ensures that when the payload is split into chunks then the number of chunked bytes is easily auditable.

Creation of an Export Header that does not contain #(X) is an alternative manifestation. The BCD 3, 3' calculates #(X) as part of its normal comparator function, but without #(X) it cannot calculate $F_t$' until all of the signed payload has arrived. It will take the BCD 3, 3' longer to complete the comparator operations in this mode, and therefore reduce the throughput of the BCD.

By design,
i. the Sender entity 8 is in communication with the BCD 3, 3', but can't sign the Payload and can't verify the Payload.
ii. The Signer entity 8 can create the export header but can't create the verification evidence of the Payload and is isolated from the BCD 3, 3', so can't forward directly the Signed Payload to the BCDs; and
iii. The Orchestrator 9 entity provides independent verification of the Payload but is isolated from the BCDs 3, 3' and the CRA 10 and is not configured to sign the payload.

There is therefore provided a three-step test that provides for 3 independent points of failure so as to provide an improved level of assurance of the payload, whilst enabling scalability as shall now be discussed.

In this use, as shown in FIG. 6, the method comprises the production of #(X) by the Orchestrator 9 rather than the Signer 8. In a first embodiment of the invention, the following method steps are provided:

1. An external Requester Entity 17 makes a request to an Orchestrator configured to validate the sending of payloads to a specific destination D so as to send payload X to D.
2. The Orchestrator 9 validates the payload against specific rules for the Requester 17 and the destination D—for example the Requester 17 may only be permitted to send specific file types, or payloads that match a particular information filter such as an XML schema.
3. If the Orchestrator rules are satisfied then the Orchestrator 9 will generate an evidence object that contains certain specifics of the Payload that appears in the Local Token $L_t$ (which is used by the Signer 8 to generate the Export Header Information)—these will typically include payload hash #(X), Actual Size, a Request UUID. To preserve the integrity of the evidence then the evidence object may be digitally signed. The Orchestrator 9 creating and assuring the integrity of the subset of $L_t$ information prevents against the Sender changing it.
4. Next, the Orchestrator 9 passes the payload X and the evidence object to the Sender 7. Alternatively, the Orchestrator may pass the evidence object to the Signer directly or pass the object into a common storage area shared with the Signer 8 to await the request for an Export Signature by the Sender 7.
5. The Sender entity 7 receives the payload X and the evidence, creates any final information needed for the Local Token $L_t$ and passes the evidence, and any additional $L_t$ information to the Signer 8 authorised to sign payloads for sending to this destination to create the Export Header Information;
6. If not in possession of a valid Release Token the Signer entity 8 requests an authorisation token from the CRA 10 for the transfer of payloads across the Boundary Control Devices 3, 3' required.

7. The CRA 10 issues a Release token $R_t$ to the Signer entity 8, including $A_t$. The Authorising Token $A_t$ is unique and is used to create ephemeral identities $S_i$ that are used to create a Release Token $R_t$ which is forwarded to the Signer Entity 8 as a response to a payload transfer authorisation request.
8. The Signer Entity 8 creates the export header information and returns it to the Sender entity 7.
9. The Sender Entity 7 creates the binary Export Header, prepends it to the payload X, and sends the signed Payload to each or any of the permitted BCDs 3, 3'.

At the Boundary Control Device 3, 3', the content in the header is then compared to known local values hard programmed in the Boundary control device 3, 3' and to the authorised parameters specified by the CRA 10, along with those in the Local token.

The Boundary Control Device 3, 3' stores the Permanent ID and is configured to access it internally/locally to enable the computation of various functions. As mentioned previously, a copy of each Boundary Control Device secret is lodged with the CRA 10. In one embodiment, the Permanent ID is determined at the time of manufacture of the gateway and is never changed. The Permanent ID of each gateway in a Gateway Group is used to generate a Session ID $S_i$, each of which is to be included in the Request Token $R_t$ for issuance to the allowed Sender Entity. This allows the Sender Entity to export the signed export payload via any of the Boundary control Devices 3, 3'. The objective is for the Sender Entity 7 to generate a binary Export Header dependent upon a File Token and an Authorising Token, that is to be sent with the Payload X to the Boundary Control Device 3, 3'.

The CRA 10 generates a 32-byte random value to be embedded in the Authorising Token so as to provide an Authorisation Token that is unique per request. For the token request to be a valid step, the Sender entity 7 must request values for the time constraints $T_{S1}$ and $T_{S2}$, the maximum payload size S and the file type F that are permitted by the CRA 10, or the CRA 10 can impose predetermined values for any or all of these fields. There are two ways of achieving this: either the Signer can ask for values and the CRA 10 agrees, or the Signer entity requests "use gateway" and the CRA 10 mandates specific values.

As well as the $T_{S1}$ and $T_{S2}$ provided by the CRA 10 in the Authorisation Token, there is provided the $T_M$ pair by the Sender Entity in the Local Token. The Session ID $S_i$ validity window (based on the $T_S$ times) may be measured in days and any payload arriving at the Boundary Control Device 3, 3' between the $T_S$ time limits will be considered to have a valid at with respect to time. However, for some applications messages may have a useful lifetime of much less than the Authorising Token $A_t$ token lifetime. To allow for messages to be rejected by the Boundary Control Device when no longer useful (as opposed to not allowed) then the $T_M$ times are used to define a "useful operational window" for messages and therefore act as a second time filter. Therefore, $T_{M1}$ can be considered to be a signed payload 'valid from' time in epoch time, whereby an export must not be accepted if epoch time is before this time. Similarly, $T_{M2}$ can be considered to be a signed payload 'valid to' time in epoch time, whereby an export must not be accepted if epoch time is after this time. $T_{M1}=T_{M2}=4$ bytes.

Once the token information and Session ID array $\{S_i\}$ has been forwarded to the Signer Entity 8 local parameters $T_{M1}$, $T_{M2}$ are re-evaluated in consideration of the CRA time limits. The Signer Entity 8 then proceeds to create a File Token $F_t$ which is used to create an Export Header comprising $A_t$, $L_t$, #X and $F_t$. As can be seen in FIG. 5, null padding is provided in the header (which is an artefact of making the hashing functions more efficient). The export header is prepended to the payload X and then forwarded onwards to the predetermined Boundary Control Device by the Sender Entity.

In a second embodiment of the invention as shown in FIG. 7, the method comprises
1. An external requester 17 sends to the Orchestrator Entity 9 a payload that is larger than the maximum size capacity of the Boundary Control Device 3, 3'.
2. Provided the Orchestrator 9 assesses the payload as suitable for the intended destination the payload can then proceed to a chucking process
3. The payload is chunked into chunks that each will be less than the maximum size that is available from the BCD 3, 3', making allowance for the export header. The chunking may involve writing physical portions of the original payload in a storage medium, or it may involve algorithmic chunking where all processes agree on a chunking algorithm and can produce identical chunks from an original payload. The latter option allows efficiency in an implementation by eliminating a storage media write cycle.
   a. The algorithm for chunking will depend on the file type and must be common between the Sender 7 and the Orchestrator 9.
   b. There must be Common agreement to the naming convention for the chunks.
4. Once chunked composite Evidence is created by the Orchestrator 9 for the Signer 8 which provides the needed information for the Signer 8 for each chunk of the payload. For each chunk there will be
   a. a part number (from 1 up to N where N is the number of chunks).
   b. Attributes of that part including: size; hash, and payload suffix (if applicable)
5. Where efficiency is required only the Evidence and a reference to the Original Payload need be sent to the Sender 7.
6. The Sender 7 sends the composite evidence to the Signer 8 as part of a request for signing the Payload.
7. The Signer 8 responds with an array of informational Export Headers, one each for each of the chunks.
8. The Sender 7 runs the chunking algorithm independently and for each chunk:
   a. Generates the Export Header for that chunk from the array of informational Export Headers;
   b. Generates the chunk name based on part number in the Local Token based on a predetermined scheme—for example if the payload name was J then the chunk N will have the payload name J∥N, where N is the part number possibly left padded e.g. Payload "File" would have chunk names "File001", "File002", and so forth;
   c. Prepends the chunk's Export Header to the chunked Payload; and
   d. Names the chunked signed payload to the Chunk Name.

The Sender 7 may dispatch the signed payload to the Gateway Group 4 using the standard mechanism. The result of this second embodiment is that any arbitrary sized payload can be sent over a single BCD 3, 3' by chunking. However, the size limit in the BCD 3, 3' is only enforced at the chunk level (so the intrinsic size control in the Authorisation Token is not useful on its own in limiting the size of a file which would be the aggregate size of all the chunks).

The use of the part number guarantees that the Local Token $L_t$ for each chunk is unique, which combined with the uniqueness of the UUID assures that the Local Token for every part of every export is unique. In addition, the use of a common UUID provides simplification of activities such as audit and accounting by allowing each part to be immediately linked to its parent intact payload. Separate and unique UUIDs may instead by used for each chunk.

By combining the first and second embodiments then any arbitrary payload can be appropriately authorised to be sent over any one of a resilient set of BCD's 3, 3' without the Sender entity 7 needing to know which BCD's 3, 3' are available, or the initiator of the export having to have the payload chunked before entering the Orchestrator 9.

Various modifications to the principles described above would suggest themselves to the skilled person. For example, there may be a further electronic entity provided in the form of a Requester entity 17 which is an entity external to the export authorisation control that wants to send the payload. In this embodiment the sender acts on behalf of the Requester Entity 17. Such a set up can be implemented for an import of a payload.

Onboarding of a new BCD can be done easily by updating the Gateway Group definition and issuing new Release Tokens to Signers, or by waiting for requests for new Release Tokens from Signers that contain the new BCD and only deploying the new BCD when all valid tokens are updated.

Removal of a BCD from service is handled transparently by removing it from the load balancer pool and stopping of issuing of new Release Tokens with ephemeral ID based on its Permanent Identity. Current valid release tokens can be used without issue until expiry.

Alternatively, the Export Header may be forwarded from the Signer in binary format.

An additional authorisation parameter can be added to the Authorisation Token to assert when chunking is allowed, and potentially the maximum number of chunks permitted along with their maximum permitted size. This can serve as an alternative to the usual $A_t$ parameter that enforces maximum payload size where such a constraint is required. Whilst it is not an essential add on to $A_t$ it is useful as chunking is a powerful operation (in risk terms due to the volume of information that can be exported in a single transaction) so being able to specify if and when and to what extent chunking is permitted has advantages.

By changing the authorisation scheme to be specific to a specialist use case, for example, TCP/IP packets (e.g. permit IP addresses and ranges for source and destination, source and destination port ranges, packet properties) then the BCD can become an flexible Layer 4 packet authoriser akin to a firewall, but one that needs no internal configuration when different packets characteristics need authorisation, and further such authorised characteristics are automatically applied across the entire BCD group. Other similar usages with strongly characterised information formats will be apparent to the subject matter experts.

Alternatively, instead of using the HMAC function, this one-way mathematical function comprises a Hash, wherein the associated secret key is formed of the Permanent ID of the Boundary Control Device $K_G$ known by the CRA 10 i.e. $S_i = \#(K_G, A_t)$. The underpinning cryptographic hash function of either of these functions is not significant and any cryptographic hash function may be used. Selection of a suitable cryptographic hash algorithm by an implementor would be motivated by, amongst other things, consideration of algorithm longevity and cryptographic strength.

In an alternative embodiment of the invention, the Local token may not be provided in the header and comparison of respective values between the Local Token $L_t$ which specifies local criteria and the Authorising Token $A_t$ which is the Central Service authorised parameters are not undertaken. Note that when the $L_t$ header is not used then a nonce/or other entropy element created by the Orchestrator is not available to provide unique headers for each payload, so the property of unique payload headers for repeated payloads and potentially chunked payloads is no longer guaranteed to be true and therefore the desirability of using this alternative embodiment is lower. That said a lack of uniqueness is not essential for the assurance to function i.e. you can't export without a signature being valid, and outside of niche risks, however once you've exported something once, it's not so bad to export it again with respect to confidentiality.

In a yet further embodiment of the invention, the CRA 10 provides an Authorisation Token $A_t$ that contains additional information which is not to be used in the release assurance or authorisation of the payload, but is instead to be used to ensure the efficient management of the scheme. For example, $A_t$ may contain a reference to a Quality of Service (QoS) that allows selection of the most urgent exports to be prioritised over less urgent exports.

Similarly, administrative information can be added to $L_t$ for similar purposes, such as in the case of chunking or otherwise altering payloads a reference to the original accepted payload.

Various alternative implementations may be provided where the Signer 8, Sender 7 and Orchestrator 9 roles need not be separated out, but may instead be combined into various consolidated roles. For example, is possible to collapse/combine i. the sender and orchestrator roles, ii. The sender and signer roles, and iii. all three.

As a signed payload is essentially just another payload type then it is possible to sign a payload that is already signed to create a multiple signed payload. This has utility when sending through serially connected BCDs Gateway Groups 4. In this alternative embodiment different signers may be used for each layer of signature.

Another alternative is to require multiple authorisations before a release is permitted. This can, for example, be implemented by adding a parameter to the Authorisation Token $A_t$ called weight W, where the aggregate values of all the weights of all the authorisation tokens must exceed a threshold. The BCD is then configured to enforce the weighting scheme chosen.

Alternatively, to considering exports, imports i.e. payload transfer from a lesser trusted network to a higher trusted network can be considered to be exports from the lesser trusted networks. From the perspective of the higher trust network the CRA for imports sits in the lesser trusted network and assures that all imports originating from the lower trust network have been authorised to be sent to the higher trusted network.

There is no requirement for all the BCD devices 3, 3' in a gateway group 4 to reside in one site—to achieve three way resilience then the BCD devices 3, 3' in a single Gateway Group 4 can be spread between three physical locations, and the load-balancer that is between the Sender and the BCDs can pick local gateways for best performance, or remote gateways if a local failure means these are unavailable. Similarly, the Signer 8, Orchestrator 9, CRA and Sender 7 may exist on more than one site to achieve full Export Assurance Scheme Resilience.

The above-mentioned embodiments enable the Assurance scheme to be set up on an Enterprise scale and enables the following requirements to be met:
1. Enable effective audit since:
   a. All export payloads are effectively identifiable;
   b. All steps in the process use a common identifier;
   c. Identifiers for export payloads are unique; and
   d. Identifiers for chunked export payloads are simply and explicitly related to the original payload request;
2. Enable resilience, performance and scale since:
   a. All parts of the Export Authorisation Control architecture must be able to be built in a resilient fashion, where resilient includes both local and site resilience;
   b. The Export Authorisation Control used with chunking options allows increased bandwidth by enabling multiple BCDs to be used in the transfer of a single payload; and
   c. The Export Authorisation Control architecture can be highly scaled in terms of bytes and payloads per unit period as there is little dependence on high security but performance limited components.
3. Enable Security since:
   a. The architecture may be deployed in component configurations where it is notable to be abused (i.e. enable the sending of normally prohibited payloads) after the compromise of a single component.
4. Simple Management since:
   a. The Export Authorisation Control enables embedding of administrative information in the Export Header to enable efficient operation of the scheme as all electronic entities.

The invention claimed is:

1. A method of payload assurance for a payload X which is to be transferred across a network boundary via any of multiple predetermined Boundary Control devices, the method comprising:
   at a first electronic entity, upon receiving a request:
      providing an electronic Authorisation token for defining properties of the payload X to be transferred;
      defining a Boundary control group located at the network Boundary comprising a plurality of Boundary Control Devices having dedicated permanent identity information associated with each of them;
      determining an ephemeral ID array in dependence upon the permanent identity information of each of the Boundary Control Devices in the Boundary Control group and the Authorisation token; and
      generating an electronic Release token in dependence upon the ephemeral ID array and the Authorisation token, to be forwarded to a second electronic entity, the release token being valid for use with the Boundary Control Devices provided in the defined Boundary Control Group.

2. The method of payload assurance for a payload X according to claim 1, the method further comprising generating at least one entropy element to form part of the electronic authorisation token for ensuring that multiple electronic authorisation tokens authorising the same payload properties are unique.

3. The method of payload assurance for a payload X according to claim 1, wherein the Release token is applied to one or more payload transfer authorisation requests during a period of validity of the Release token.

4. The method of payload assurance for a payload X according to claim 3, wherein the period of validity of the Release token depends upon a predetermined time period defined in the Authorisation token by the first electronic entity.

5. The method of payload assurance for a payload X according to claim 1, wherein on receipt of the Release token and upon a payload transfer request the second electronic entity creates a File token for each Boundary Control Device in a gateway group dependent upon the ephemeral array, a Local token comprising parameters defined remotely from the first entity and a hash digest of the payload X to be transferred, so as to provide an array of File tokens $\{F_t\}$.

6. The method of payload assurance for a payload X according to claim 5, wherein the hash digest is provided by passing the payload X through a one-way function prior to the payload X being received by the second entity as a part of the payload transfer request.

7. The method of payload assurance for a payload X according to claim 5, wherein the Local token comprises an entropy element.

8. The method of payload assurance for a payload X according to claim 5, wherein at least one of the Local token parameters are provided by a third electronic entity for validating desired payload parameters for payload transfer across the Network Boundary.

9. The method of payload assurance for a payload X according to claim 8, wherein a fourth electronic entity acting as a payload sender entity and the sole electronic entity in contact with the Boundary Control Devices of the Boundary Control Group, defines at least one of the Local token parameters.

10. The method of payload assurance for a payload X according to claim 8 wherein the third electronic entity validates the payload against predetermined rules provided upon receipt of the payload transfer request and/or an intended payload transfer destination and provides an evidence object of the validation for inclusion in the Local token.

11. The method of payload assurance for a payload X according to claim 5, wherein the second entity is configured to subsequently generate a payload Header dependent upon the Authorisation token, the Local token, the file token array and the hash digest of the payload.

12. The method of payload assurance for a payload X according to claim 11, wherein the payload Header is prepended to the payload X prior to the payload X being forwarded by a fourth entity to one or more Boundary Control Devices in the Boundary Control group.

13. The method of payload assurance for a payload X according to claim 12, wherein upon at least part of the payload having payload Header E reaching a Boundary Control Device, the Boundary Control Device regenerates the Session ID $(S_i)g$ using permanent ID information of the Boundary Control Device and an Authorisation Token from the payload Header.

14. The method of payload assurance for a payload X according to claim 13, wherein at one of the Boundary Control Devices, a Session ID is used, along with parameters within the payload Header to calculate a file token $F_t'$.

15. The method of payload assurance for a payload X according to claim 14, wherein $F_t'=\#(\#(X), L, J, HMAC(K_G', A))$ from the payload header, wherein the Session ID is $HMAC(K_G', A)$.

16. The method of payload assurance for a payload X according to claim 15, wherein the Boundary Control Device compares the File token $F_t'$ to the File token array located in the Header E to determine whether the File token is identical to a value in the File token array $\{F_t\}$ and in a case that there is a match, subsequently generating a first positive event outcome identifier.

17. The method of payload assurance for a payload X according to claim 16, wherein the Boundary Control Device passes the payload through a one way function to provide $\#(X)_g$ from X and com-pares $\#(X)_g$ with $\#(X)$ of the Header E, and in the case that there is a match, subsequently generating a second positive event outcome identifier.

18. The method of payload assurance for a payload X according to claim 17, the Boundary Control Device further comparing other control criteria contained in an export or import header to ensure the control criteria are within predefined limits and in the case that it is, providing a third positive outcome identifier.

19. The method of payload assurance for a payload X according to claim 18, wherein the Boundary Control device identifies a first positive outcome identifier, a second positive outcome identifier and a third positive outcome identifier and subsequently determines a positive boundary control outcome.

20. The method of payload assurance for a payload X according to claim 19, wherein the Boundary Control Device transfers the payload X having Header E through the Boundary Control Device and across a network/domain boundary in the case that a positive boundary control outcome has been met.

21. The method of payload assurance for a payload X according to claim 20, wherein the Boundary control device is configured to prohibit passage of the file across the network/domain boundary and/or enable the file to be dropped in the case that a positive boundary control outcome has not been met.

22. The method of payload assurance for a payload X according to claim 1, wherein the one or more Boundary Control devices of a Boundary Control Group blocks invalid export headers and non-compatible payloads with valid headers in dependence upon the Authorisation token and the Ephemeral ID Array.

23. The method of payload assurance for a payload X according to claim 5, wherein the payload is split into chunks that are less than the maximum size available from the Boundary Control Devices in the Boundary Control group.

24. The method of payload assurance for a payload X according to claim 23, further comprising creating an array of Payload Headers, one for each of the chunks based on the Authorisation Token, File Token, Local Token and a Hash table of the Payload.

25. The method of payload assurance for a payload X according to claim 24, further comprising prepending chunk's Payload Header to the corresponding chunked Payload and forwarding a resulting signed payload chunks to one or more Boundary control Device in the Boundary Control Group.

26. A payload assurance system for a payload X which is to be transferred across a network boundary via at least one predetermined boundary control device, the system comprising a first electronic entity having at least one computer processor and at least one data storage device, the at least one data storage device comprising instructions operative by the at least one computer processor to:
generate an electronic Authorisation token for defining properties of the payload X to be transferred;
define a Boundary control group located at the network Boundary comprising at least two Boundary Control Devices having dedicated permanent identity information associated with each of them;
determine an ephemeral ID array in dependence upon the permanent identity information of each of the Boundary Control Devices in the Boundary Control group and the Authorisation token; and
generate an electronic Release token in dependence upon the ephemeral ID array and the Authorisation token, to be forwarded to a second electronic entity in the system, the release token being valid for use with the Boundary Control Devices provided in the defined Boundary Control Group.

27. The payload assurance system according to claim 26, wherein the electronic authorisation token further comprising at least one entropy element for ensuring that multiple electronic authorisation tokens authorising the same payload properties are unique.

28. The payload assurance system according to claim 26, comprising multiple separate and distinct electronic entities, comprising of at least one Authoriser entity, at least one Sender entity, at least one Signer entity, and at least one Payload validation entity.

29. The payload assurance system, according to claim 28, further comprising the Signer entity being configured to sign any number of payloads using the Release token during a period of validity of the Release token.

30. The payload assurance system according to claim 29, wherein on receipt of the Release token and upon receipt of a payload export request the Signer entity is configured to calculate a file token for each Boundary Control Device in a gateway group dependent upon the ephemeral array, a Local token and a hash digest of the payload to be transferred, so as to provide an array of file tokens $\{F_t\}$.

31. The payload assurance system according to claim 30, wherein the hash digest is provided by passing the payload through a one-way function prior to forwarding the payload X to the Signer entity.

32. The payload assurance system according to claim 30, wherein the Local token defines parameters associated with the payload, a payload transfer destination and/or as defined by the Sender entity.

33. The payload assurance system according to claim 30, wherein the Local token comprises an entropy element.

34. The payload assurance system according to claim 30, wherein parameters of the Local token are provided by the payload validation entity and/or the Sender Entity.

35. The payload assurance system according to claim 32, wherein the payload validation entity is configured to validate the payload against predetermined rules of the requester and/or a payload destination and is configured to provide an evidence object of the validation for inclusion in the Local token.

36. The payload assurance system according to claim 30, wherein the Signer entity is configured to subsequently generate a payload Header dependent upon the Authorisation token, the Local token, the File token array and the hash digest of the payload.

37. The payload assurance system according to claim 36, wherein the header is prepended to the payload prior to being forwarded to one or more BCDs of the gateway group.

38. The payload assurance system according to claim 28, wherein the payload is split into chunks that are less than the maximum size available from the Boundary Control Devices in a Gateway group.

39. The payload assurance system according to claim 38, further comprising the Signer entity being configured to create an array of Payload Headers, one for each of the chunks based on the Authorisation Token, File Token, Local Token and a Hash table of the Payload.

40. The payload assurance system according to claim 39, further comprising the Signer entity being configured to prepend chunk's Payload Header to the corresponding chunked Payload and to forward resulting signed payload chunks to one or more Boundary control Device in the Boundary Control Group.

41. The payload assurance system according to claim 37, wherein on receipt of the payload at a Boundary Control Device, the Boundary control device is configured to regenerate the gateway session ID $(S_i)_g$ using the Boundary Control devices permanent ID information and the Authorisation Token from the Header.

42. The payload assurance system according to claim 41, wherein at the Boundary Control Device the Session ID is used, along with parameters within the Header to calculate a file token $F_t'$.

43. The payload assurance system according to claim 42, wherein $F_t'=\#(\#(X), L, J, HMAC(K_G', A))$ from the header, wherein the Session ID is HMAC $(K_G', A)$.

44. The payload assurance system according to claim 42 wherein the Boundary Control Device has a comparator configured to compare the File token $F_t'$ to the File token array located in the Header to determine whether the File token is identical to a value in the File token array $\{F_t\}$ and in a case that there is a match the comparator is configured to generate a first positive event outcome identifier.

45. The payload assurance system according to claim 43, wherein the Boundary Control Device is configured to pass the payload through a one way function to provide $\#(X)_g$ from X, and a comparator subsequently compares $\#(X)_g$ with $\#(X)$ of the Header, and in a case that there is a match, the comparator is configured to generate a second positive event outcome identifier.

46. The payload assurance system according to claim 43, the Boundary Control Device further comparing other control criteria contained in the export or import header to ensure they are within predefined limits and in the case that it is, the comparator configured to provide a third positive outcome identifier.

47. The payload assurance system according to claim 44, the Boundary Control device configured to identify a first positive outcome identifier, a second positive outcome identifier and/or a third positive outcome identifier and subsequently determining a positive boundary control outcome in dependence upon the first positive outcome identifier, the second positive outcome identifier and the third positive outcome identifier.

48. The payload assurance system according to claim 47, wherein the Boundary Control Device is configured to transfer the payload X through the Boundary Control Device and across a network/domain boundary in the case that a positive boundary control outcome has been met.

49. The payload assurance system according to claim 47, wherein the Boundary control device is configured to prohibit passage of the file across a network/domain boundary and/or enable the payload to be dropped in the case that a positive boundary control outcome has not been met.

50. The payload assurance system according to claim 28, wherein the at least one Sender entity is the sole electronic entity in communication with least one Boundary Control Device.

51. The payload assurance system according to claim 27, comprising a random number generator or pseudo random number generator for providing the entropy element of the electronic Authorisation token and/or a Local token.

52. An export control system for a payload X which is to be transferred across a network boundary via at least one predetermined boundary control device, the system comprising a first electronic entity having at least one computer processor and at least one data storage device, the at least one data storage device comprising instructions operative by the at least one computer processor to:
   generate an electronic Authorisation token for defining properties of the payload X to be transferred;
   define a Boundary control group located at the network Boundary comprising at least two Boundary Control Devices having dedicated permanent identity information associated with each of them;
   determine an ephemeral ID array in dependence upon the permanent identity information of each of the Boundary Control Devices in the Boundary Control group and the Authorisation token; and
   generate an electronic Release token in dependence upon the ephemeral ID array and the Authorisation token, to be forwarded to a second electronic entity in the system, the release token being valid for use with the Boundary Control Devices provided in the defined Boundary Control Group.

53. A payload assurance system for assuring a payload for transfer from a lesser trusted network to a trusted network (or vice versa) for a payload X, the system comprising a first electronic entity having at least one computer processor and at least one data storage device, the at least one data storage device comprising instructions operative by the at least one computer processor to:
   generate an electronic Authorisation token for defining properties of the payload X to be transferred;
   define a Boundary control group located at a network Boundary comprising at least two Boundary Control Devices having dedicated permanent identity information associated with each of them;
   determine an ephemeral ID array in dependence upon the permanent identity information of each of the Boundary Control Devices in the Boundary Control group and the Authorisation token; and
   generate an electronic Release token in dependence upon the ephemeral ID array and the Authorisation token, to be forwarded to a second electronic entity in the system, the release token being valid for use with the Boundary Control Devices provided in the defined Boundary Control Group.

54. A network comprising:
   a payload assurance system for assuring a payload for transfer from a lesser trusted network to a trusted network (or vice versa), the payload assurance system comprising a first electronic entity having at least one computer processor and at least one data storage device, the at least one data storage device comprising instructions operative by the at least one computer processor to:
      generate an electronic Authorisation token for defining properties of a payload X to be transferred;
      define a Boundary control group located at a network Boundary comprising at least two Boundary Control Devices having dedicated permanent identity information associated with each of them;
      determine an ephemeral ID array in dependence upon the permanent identity information of each of the Boundary Control Devices in the Boundary Control group and the Authorisation token; and
      generate an electronic Release token in dependence upon the ephemeral ID array and the Authorisation token, to be forwarded to a second electronic entity in the system, the release token being valid for use with the Boundary Control Devices provided in the defined Boundary Control Group.

* * * * *